(No Model.) 2 Sheets—Sheet 1.
J. K. GRIFFIN.
METHOD OF REDUCING ORES, &c.
No. 318,245. Patented May 19, 1885.
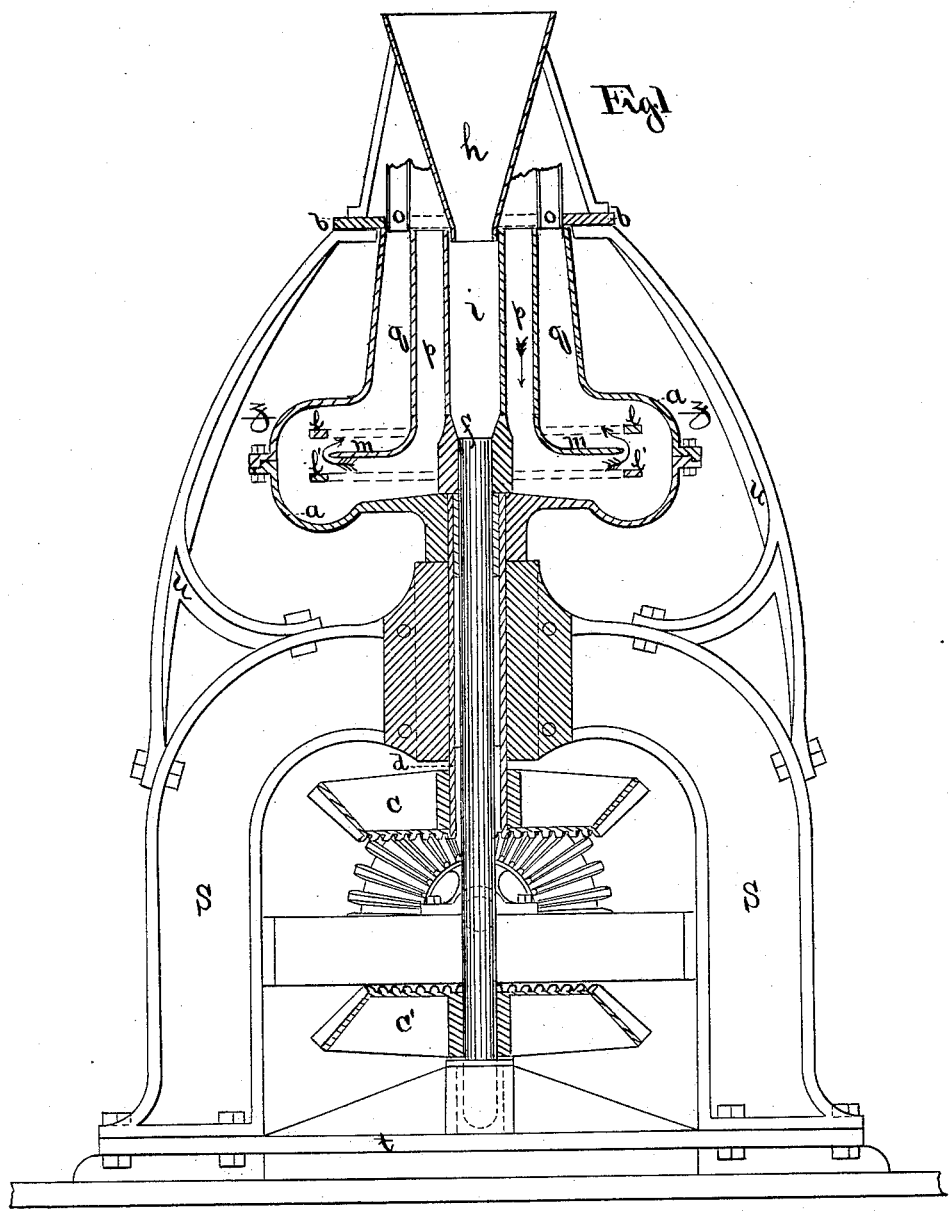
Witnesses
Lyndon P. Smith.
James Percy Griffin.
Inventor
James K. Griffin

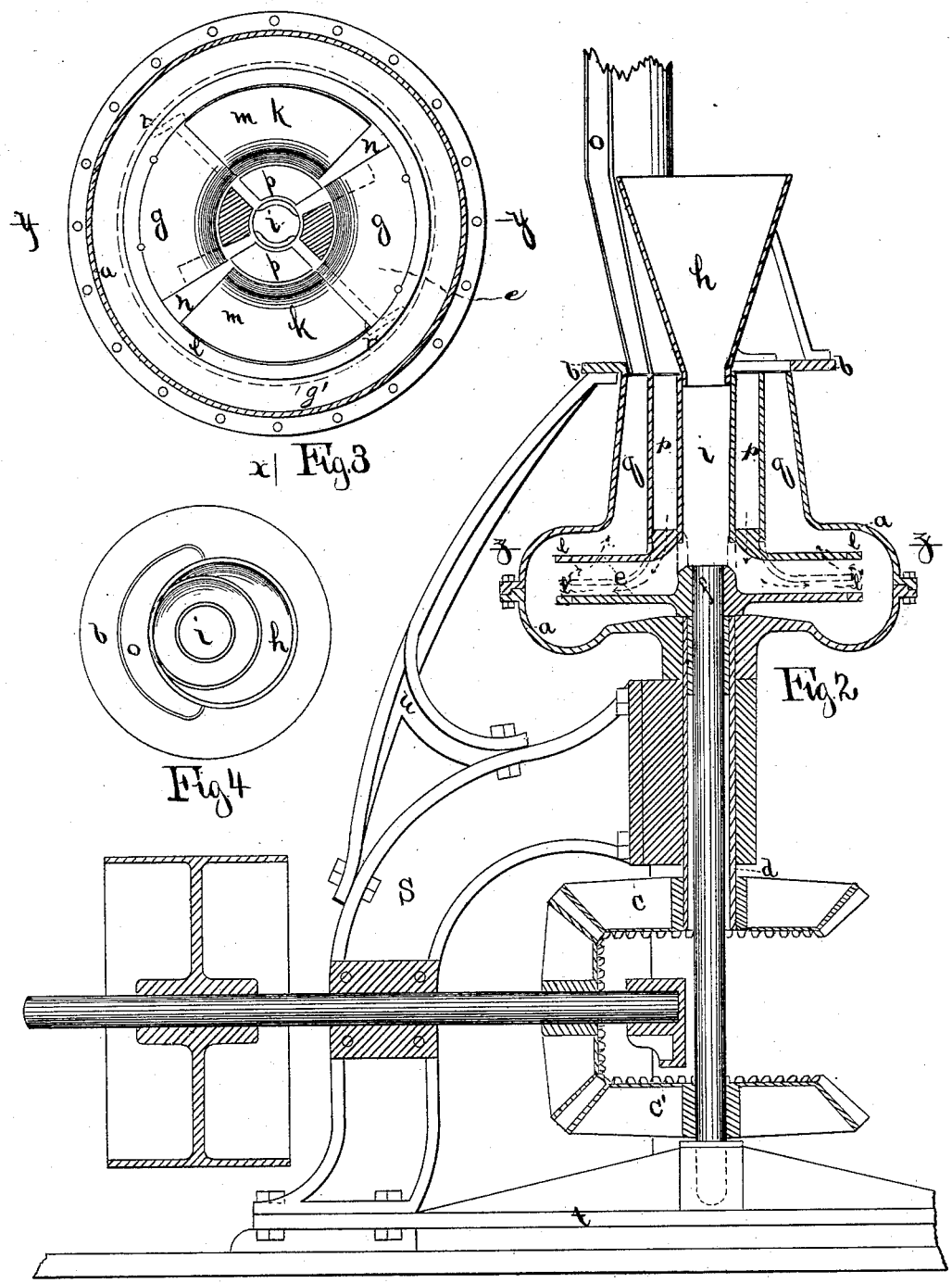

UNITED STATES PATENT OFFICE.

JAMES K. GRIFFIN, OF BROOKLYN, NEW YORK, ASSIGNOR TO THE GRIFFIN MANUFACTURING COMPANY.

METHOD OF REDUCING ORES, &c.

SPECIFICATION forming part of Letters Patent No. 318,245, dated May 19, 1885.

Application filed August 14, 1884. (No model.)

*To all whom it may concern:*

Be it known that I, JAMES K. GRIFFIN, a citizen of the Dominion of Canada, residing in the city of Brooklyn, in the county of Kings and State of New York, have invented certain new and useful Improvements in Methods of Reducing Ores and other Substances, of which the following is a specification.

My invention relates to a method of reducing ores and other substances by attrition; and it consists in carrying off the reduced substances by passing a current of air directly upon the line of attrition between opposing revolving surfaces of the material to be reduced.

It further consists in forming and maintaining a line of attrition between opposing surfaces of the substance to be reduced by passing said substance through a rotating conveyer and against an annular wall of the same substance firmly compacted in a rotating shell, and then carrying the pulverized substance off by a current of air communicating directly with the line of attrition, as will be hereinafter more fully described, and pointed out in the claims.

The object of my invention is to provide a method of reducing refractory ores and other substances better and more economically than has heretofore been done. This method may be carried out in machines and by devices of various constructions; but I prefer to use the mechanism illustrated in the accompanying drawings, forming a part of this specification, wherein like letters refer to similar parts, and in which—

Figure 1 is a vertical section of the machine, taken on the line *x x* in Fig. 3. Fig. 2 is a vertical section thereof, taken on the line *y y*, Fig. 3. Fig. 3 is a horizontal section thereof, taken on the line *z z*, Figs. 1 and 2. Fig. 4 is a plan view of the top of the machine, showing the hopper and exhaust-pipe.

The letter *a* indicates a spheroidal shell or case made, preferably, of upper and lower sections bolted together at their peripheral edges, and forming a close tight-bottomed receptacle. It is made open at the top and revolves as closely as may be beneath a cap-plate or cover, *b*. This cover is bolted to the machine-frame, and is provided with openings for the passage of the material to and from the machine, as hereinafter described.

Within the shell or case *a* is a rotating conveyer, *e*, which is fast on a shaft, *f*. This shaft is journaled in bearings in a tubular shaft or sleeve, *d*, and in a lower step bearing on the frame. The sleeve *d* is rigidly connected to the shell *a* and journaled in boxes on the machine-frame. A bevel gear-wheel, *c*, is fast on the sleeve *d*, and a bevel gear-wheel, *c'*, is fast on the shaft *f*, so that suitable bevel-gears on a driving-shaft may mesh with gears *c c'* for rotating the shell *a* and conveyer *e* independently of each other. Preferably, the gearing is so arranged that the shell *a* shall have twice the rotative speed of the conveyer *e*, and so that the shell and conveyer rotate simultaneously in opposite directions.

The rotative speed of the shell and conveyer, respectively, may be varied to suit the requirements of different classes of material, and effective results have been attained by rotating the shell and conveyer in the same direction when the speed of the shell considerably exceeds that of the conveyer. The conveyer *e* is divided vertically and radially, preferably into four passages arranged in opposite pairs, two opposite passages, *g g*, being arranged so as to connect with the central passage, *i*, which opens into the hopper *h*, to conduct therefrom the crude substance down to the outlets of the passages *g*. These outlets face the inner periphery of the shell *a*, and have, preferably, a rectangular form and a marginal contour conforming horizontally to the curve of the shell.

In the construction of machines for different substances, the space between the outlets and the inside of the shell may be varied according to the quality of the material to be compacted or consolidated therein, as some substances require more space than others for the formation of a firm annular wall.

The compartments *k k* of the conveyer *e*, which alternate with its passages *g g*, are divided horizontally by plates *m*, so that the spaces under them connect with the passages *p p* and the spaces above them with the exhaust-pipes *o o*, to provide passages around the plates *m* for a current of air, which current of air may be caused by a suction-fan or other suitable device. The rings *l l* are employed to strengthen and protect the conveyer.

The letters *s s* indicate the upright supports of the machine-frame, which are bolted to its base *t t*. These supports sustain the arms *u u*, upon which are supported the top plate, *b*, hopper *h*, and exhaust-pipes *o o*.

By reference to the operation of the machine I can now explain the distinctive features of my improved method of reduction. The crude substance is supplied from the hopper *h*, through the opening *i*, into the passages *g* of the rotating conveyer *e*, and discharged therefrom by centrifugal force against the opposite inner surface of the rotating shell *a*, but without grinding effect until the shell is filled to the edges of the passages *g*. Meanwhile the centrifugal force developed by the rotation of the shell packs the material received from the conveyer *e* into an annular solid wall of sufficient firmness to resist the masses forced against and ground upon it, the said wall being indicated by dotted lines, as at *g'*. As the rotation of the shell and conveyer continues the greater solidity of the annular wall, due to the greater rotative velocity of the shell, gives it a resisting power sufficient to pack the material forced against it, so that the firm bodies of material in the shell and conveyer, respectively, rotating in opposite directions, are solidly ground against each other on a well-defined line of attrition just outside of and off from the periphery of the conveyer and wholly within the material. The greater the excess of rotating speed in the shell over the conveyer the more compact and solid will the respective bodies in the shell and conveyer be. The solid impact and grinding of the material practically excludes the air from the line of attrition, thereby facilitating the reducing process. As the work of reduction progresses a current of air, passed downward through passage *p* and under plate *m* immediately against the annular wall at its exposed surface between the passages *g g*, acts as an air-brush, and by a rotating or whirling motion sweeps the reduced material clean from the surface of the annular wall directly in the line of attrition as fast as the reduction takes place, leaving the clean, sharp, and unclogged surfaces of compact crude material to grind against each other, while the powdered product is carried off by the same current over the plate *m* upwardly through the exhaust-pipes *o o* to any suitable settler or reception-chamber. The force of the current of air is adjusted to and determines the grade of fineness in the product—the lighter the draft the finer the product, and vice versa. This is due to the fact that if the current of air is strong it takes up and carries off all the pulverized particles, whether they are coarse or very fine, whereas if the current of air is weak it will not carry off the coarser particles, and allows them to be ground over and over again until they are fine enough to be carried off by the current of air.

I have demonstrated by continued use that with the shell and conveyer rotating in opposite directions at low speed, not exceeding from one hundred and fifty to two hundred revolutions per minute, very hard substances, as quartz and phosphate rock, can by my method be pulverized in satisfactory quantities to the finest or impalpable powder without injury to the machine.

I make no claim herein for the particular construction of the machine by which I have explained my improved method herein described, as I have applied for a patent on the machine in a separate application, Serial No. 159,399, March 19, 1885.

Having thus described my invention, what I claim as new, and desire to secure by Letters Patent, is—

1. In the reduction of ores and other substances by attrition, the herein-described method of carrying off the reduced substances, which consists in passing a current of air directly upon the line of attrition between opposing revolving surfaces of the material being reduced, substantially as described.

2. The herein-described method of reducing ores or other substances, which consists in forming and maintaining a line of attrition between opposing surfaces of the substance to be reduced by passing said substance through a rotating conveyer and against an annular wall of the same substance firmly compacted in a rotating shell, and then carrying the pulverized substance off by a current of air communicating directly with the line of attrition, substantially as described.

In testimony whereof I affix my signature in presence of two witnesses.

JAMES K. GRIFFIN.

Witnesses:
LYNDON P. SMITH,
JAMES PERCY GRIFFIN.